United States Patent [19]

Herman

[11] Patent Number: 4,466,520

[45] Date of Patent: Aug. 21, 1984

[54] SELF-CONTAINED CLUTCH USEFUL FOR SINGLE REVOLUTION APPLICATIONS

[75] Inventor: Richard L. Herman, Boca Raton, Fla.

[73] Assignee: International Business Machines Corporation, Armonk, N.Y.

[21] Appl. No.: 327,826

[22] Filed: Dec. 7, 1981

[51] Int. Cl.³ .............................................. F16D 11/02
[52] U.S. Cl. ........................................ 192/28; 192/25;
192/26; 192/33 R; 192/71; 192/84 T
[58] Field of Search ............... 192/25, 26, 67 P, 33 R, 192/71, 84 T, 28

[56] References Cited

U.S. PATENT DOCUMENTS

| | | | |
|---|---|---|---|
| 390,886 | 10/1888 | Merriman | 192/25 |
| 998,806 | 7/1911 | Sounders | 192/25 |
| 1,088,723 | 3/1914 | Rathsam | 192/28 |
| 1,798,928 | 3/1931 | Campbell | 192/71 |
| 2,626,028 | 1/1953 | Brougher | 192/33 |
| 2,711,237 | 6/1955 | Wylie | 192/33 |
| 2,907,432 | 10/1959 | Strickland et al. | 192/71 |
| 3,051,285 | 8/1962 | West et al. | 192/148 |
| 3,130,826 | 4/1964 | Davis et al. | 192/12 |
| 3,221,855 | 12/1965 | Newlin | 192/84 |
| 3,237,736 | 3/1966 | Siok | 192/25 |
| 3,612,234 | 10/1971 | Albrecht | 192/28 |
| 3,948,374 | 4/1976 | Whyte | 193/33 |

OTHER PUBLICATIONS

IBM Technical Disclosure Bulletin, "Non-Searching One Revolution Clutch" by H. Reichle, Jun. 1964, pp. 89–90.

*Primary Examiner*—Rodney H. Bonck
*Assistant Examiner*—James J. Merek
*Attorney, Agent, or Firm*—Earl C. Hancock

[57] ABSTRACT

Rotary input power is selectively coupled to an output shaft or the like by actuation of a plunger which forces a movable pin into a coupled relation between a member attached to the input drive and an arm attached to the output. A fixed wall establishes a guideway for the head of the pin until it reaches an aperture in the wall allowing pin extraction as by a spring, gravity or the like. Coupling is established by the pin passing through a hole in the arm attached to the output and a detent or transverse surface associated with the driven element. The device permits coupling a continuously rotating input to an output for one revolution although more or less than full revolutions are possible.

4 Claims, 11 Drawing Figures

SELF-CONTAINED CLUTCH USEFUL FOR SINGLE REVOLUTION APPLICATIONS

TECHNICAL FIELD

The present invention relates to clutch mechanisms for coupling rotary input power to a rotary output. More particularly, the present invention relates to clutch mechanisms selectively operable to produce at least a segment of a revolution to an output from a rotary input drive. The invention is particularly well suited for applications wherein a single revolution of output from a rotating input drive is needed. Although not necessarily so limited, this invention is especially useful for sheet feeding, toner dispensing control and other applications associated with xerographic copier/duplicator devices.

BACKGROUND ART

Prior clutch mechanisms for temporarily coupling a continuously rotating drive to an output have taken many forms including mechanically actuated closures of spring-biased face plates, electromagnetically actuated clutches, pawl and ratchet combinations and so forth. Such devices maintain the coupling of power as long as the actuating signal or force is present. Various uses of such clutches require less than continuous coupling of input to output and automatic clutch disengagement after a predetermined amount of rotary output is produced. A particular need for such devices is in applications wherein coupling of a single revolution of rotary input power to an output device is needed.

One example of a single revolution clutch in the prior art is an arrangement wherein a pawl on one member engages a ratchet on the other and is initiated by an actuation movement to start the rotation with release of the pawl at the end of one revolution by a stop mechanism. For instance, the June 1964 *IBM Technical Disclosure Bulletin* (Vol. 7, No. 1) at pages 89-90 in the article entitled "Non-Searching One Revolution Clutch" by H. Reichle shows such a pawl and ratchet combination wherein the pawl is normally biased by a spring into the engagement direction but an intercepting shoulder configuration releases the pawl after each single revolution. Movement of the intercepting shoulders initiates coupling by releasing the pawl for engagement.

Yet another version of a single revolution clutch is shown in U.S. Pat. No. 2,626,028 by Brougher wherein an inner member with an arcuate groove including a stub wedge continuously rotates from the primary power source. A pin is biased inwardly through a ring into the groove except when cam faces and rollers force the shaft on which the pin is mounted in an outward direction so that the pin is retracted from the groove and held in an extended position. While the pin is within the groove, the stub wedge engages the pin and rotates the ring with the innerdriven member.

The prior art self-contained clutches are all relatively complex in manufacture and operation and suffer varying degrees of reliability loss because of the various moving elements required. In addition, relatively intricate fabrication processes are required, further increasing the manufacturing cost of such single revolution clutches.

DISCLOSURE OF THE INVENTION

The present invention is the simplest, self-contained clutch mechanism known for allowing coupling of at least a segment of a revolution of an input drive to an output in response to an actuation signal and/or movement. The invention is described subsequently with reference to a particular application for use as a metering control device for toner transfer from a reservoir to a developer in a xerographic copier but various other applications including paper feed controls, paper sheet selectors and other applications in other mechanisms such as typewriters, printers and the like are readily apparent. The cost of manufacture of the present invention as compared to known one-rotation clutch mechanisms is significantly lower.

A clutch in accordance with this invention couples rotary mechanical power between first and second members in response to movement of at least one plunger element. It includes a hub rotatably attached to one of those members with this hub having one or more surfaces extending in a direction transverse to the direction of rotation of the hub. A plate is rotatably mounted and attached for applying rotary drive power to the other of the members. This plate has a hole located so that a surface thereof aligns with the surface of the hub at least once for each revolution of the hub. A pin is movably mounted in the plate hole and has a length for assuming essentially either of two positions. In one position, an end portion of the pin engages the aligned hub and plate surfaces; in the second position, the aforementioned pin end portion clears the hub surface. The opposite end portion of the pin is retained so as to maintain the pin in the hub surface engaging position for at least a portion of the rotation of that hub. This retention further permits the pin opposite end to move away from the plate so as to assume the second position at at least one location for each revolution of the plate. The plunger element is received by the retaining means so as to engage the pin at the aforementioned location for shifting the pin from the disengage to the engage position in response to movement of the plunger element.

The clutch can include an arrangement for urging the pin towards the second or disengaged position at the plunger element receiving location of the retainer. In one form, this urging means includes means for applying a bias force to the pin in the direction of the disengaged position. By including a shoulder on the pin transverse to its length, the bias force is obtainable by including a spring between this shoulder and the plate in which it is slidably mounted. Yet another arrangement for the urging means is to include a cam surface to engage a pin shoulder and direct the pin towards the disengaged position.

By including a plurality of transverse surfaces on the hub in spaced relation around the axis of rotation of that hub, the time lag between actuation of the plunger and actual coupling between the hub and the plate is minimized. In addition, it is readily apparent that a multiplicity of plungers and appropriate pin receiving arrangements are includable to allow multiple short segment couplings of rotary drive from an input to an output.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
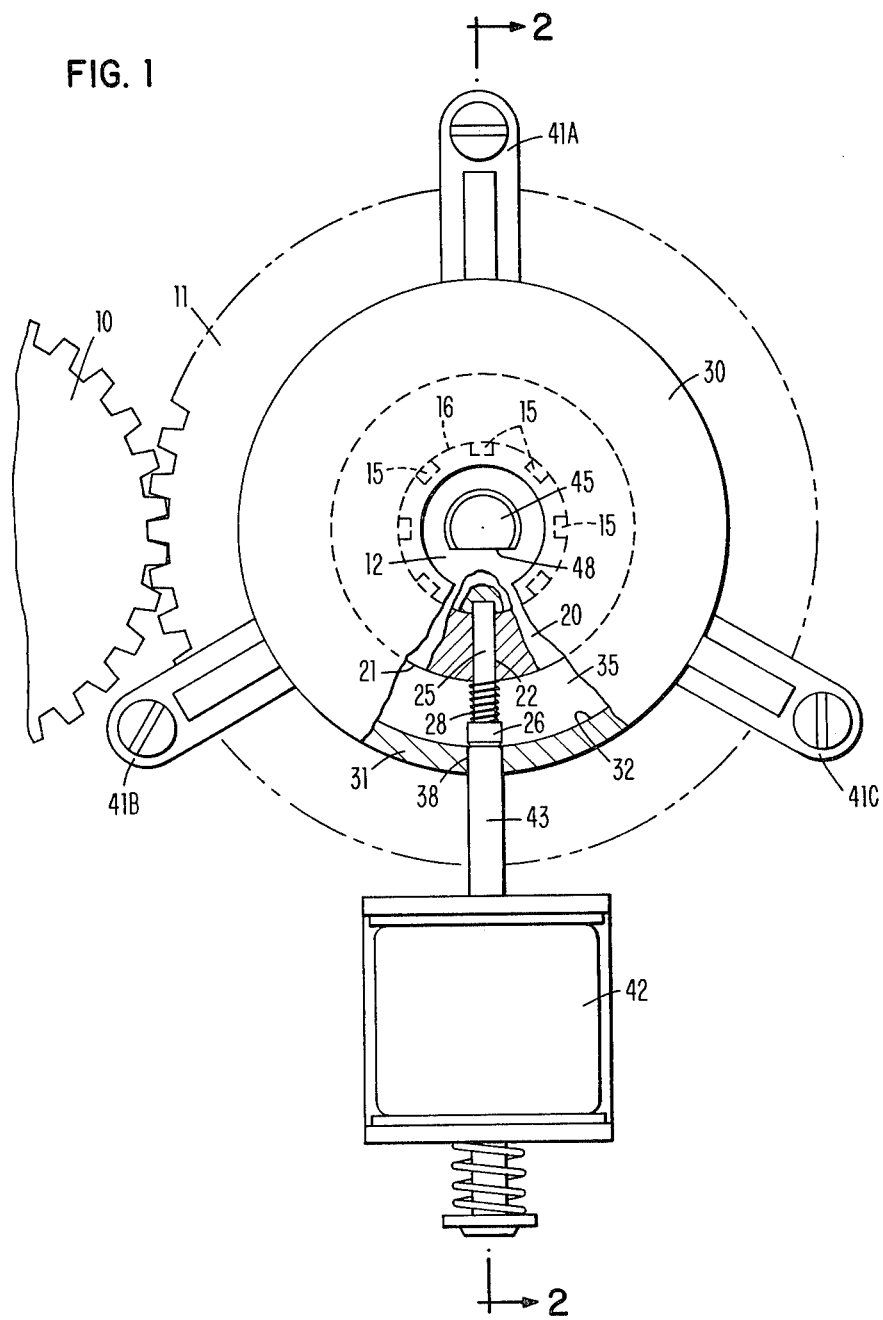
FIG. 1 is a partially broken and sectioned plan view of a single revolution clutch constructed in accordance with one embodiment of the present invention.
Figure 2:
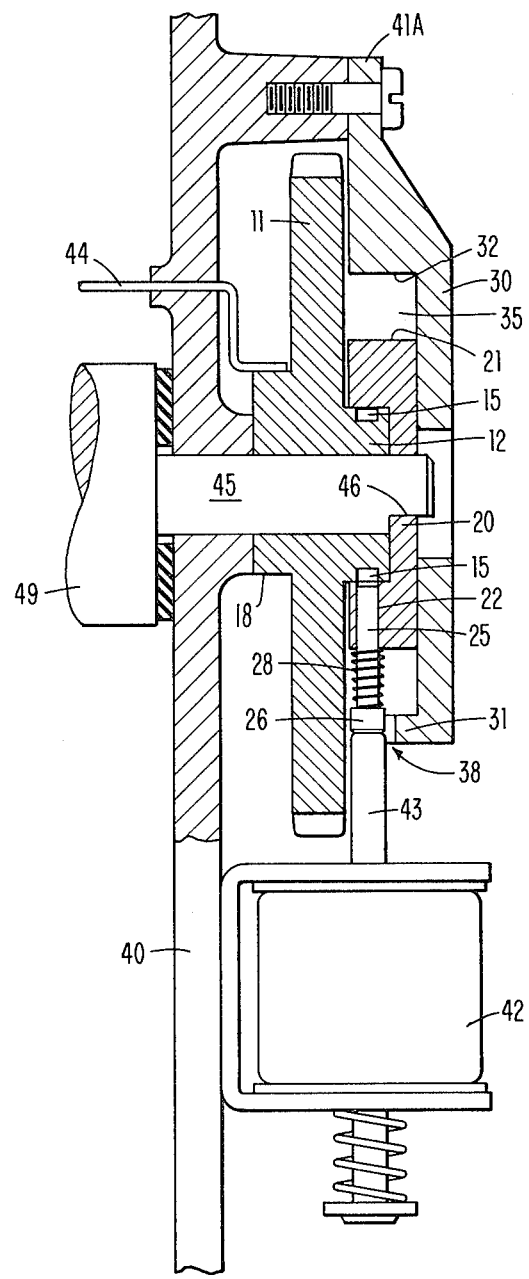
FIG. 2 is a side, partially sectioned view of the FIG. 1 embodiment further illustrating its association with elements of a toner metering structure in a copier/duplicator.
Figure 3:
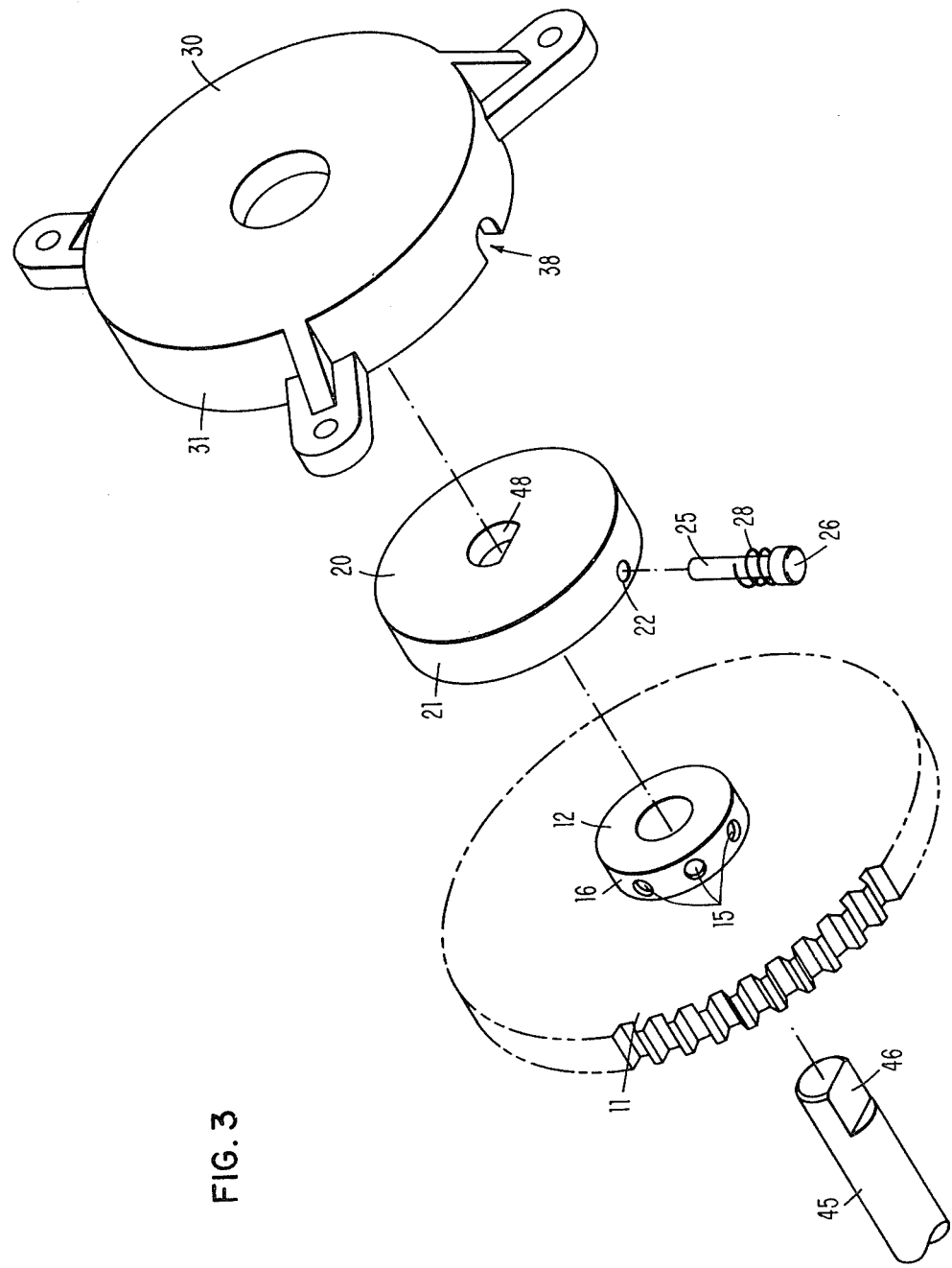
FIG. 3 is a disassembled perspective view of the FIG. 1 embodiment.
Figure 4A:
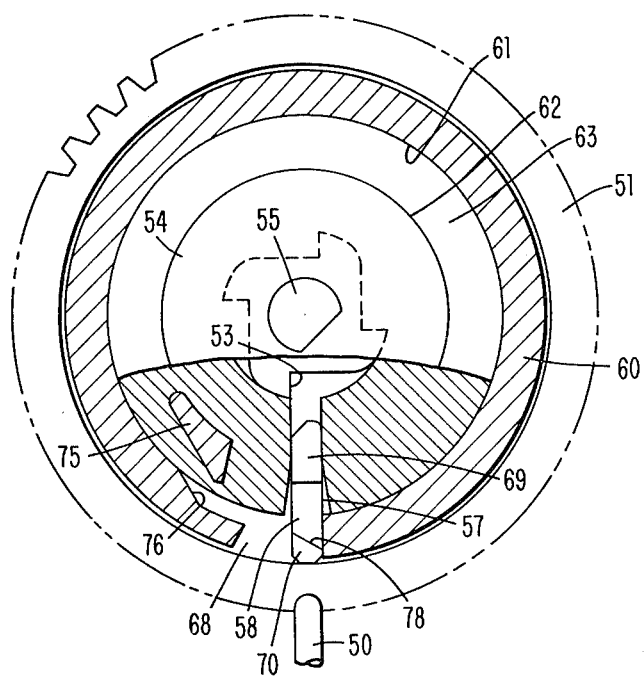
FIGS. 4A-4D are partially broken and sectioned plan views illustrating operating relationships of components in a second embodiment of the present invention.
Figure 4B:
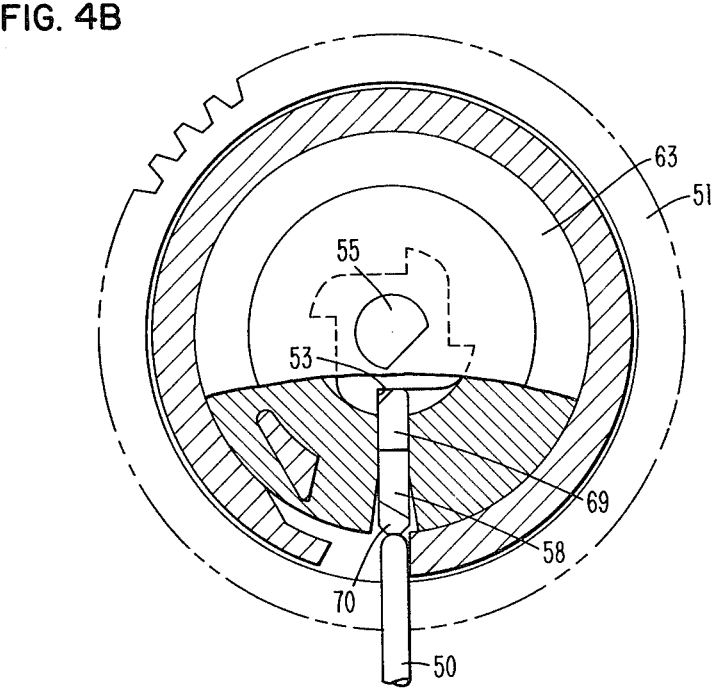
Figure 4C:
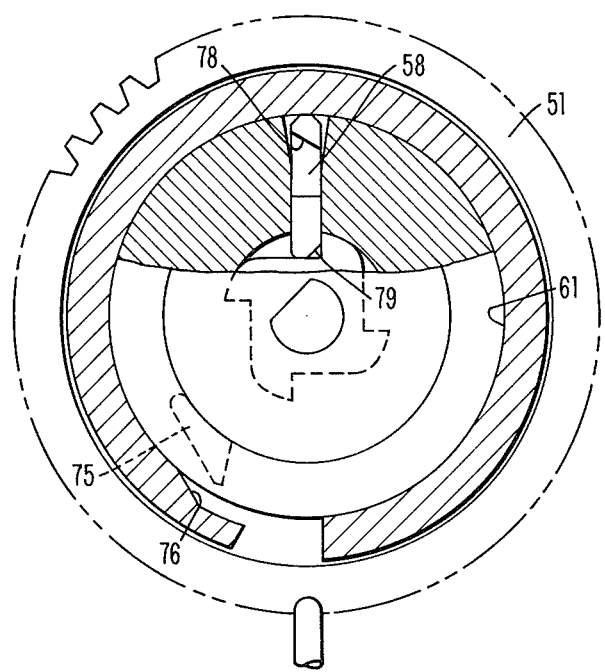
Figure 4D:
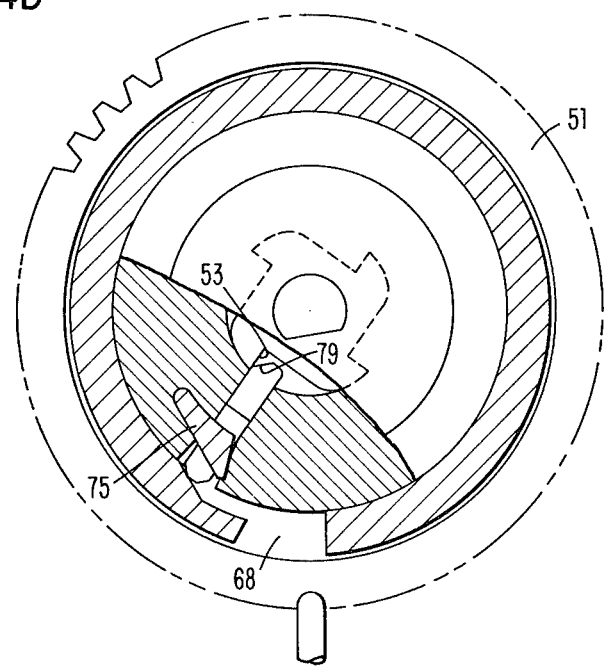

FIGS. 1-3 illustrate a front plan view, a side sectioned view and an exploded view, respectively, of one embodiment of the present invention configured for a one-revolution clutch coupler. Input drive is provided by gear 10 continuously driving gear 11 which has a centrally located hub 12. In this example, hub 12 includes a plurality of holes 15 extending inwardly from the peripheral surface 16. Thus, no matter which direction gear 11 might happen to rotate, each of holes 15 includes at least one surface which is transverse to the direction of rotation of hub 12.

A somewhat cup-shaped cap 20 is positioned in concentric, surrounding relation over peripheral surface 16 of hub 12 and in a manner so that cap 20 can freely rotate around hub 12. As shown, cap 20 has one hole 22 therethrough which extends in radial relation to the axis of rotation of hub 12 and is located so as to periodically align with each of holes 15 as hub 12 rotates relative to cap 20. A pin 25 of a T-shaped cross section is arranged to fit within hole 22 and is movable between an engaged position, as shown generally in FIG. 1, and a disengaged position, as shown in FIG. 2. End portion 26 of pin 25 has a transversely extending shoulder for receiving spring 28 which normally biases pin 25 in a radially outward direction away from hub holes 15.

Cover 30 is also formed somewhat in a cup-shaped arrangement with a collar portion 31 extending in spaced but generally surrounding relation to inner cap 20. Thus, inner peripheral face 32 of collar 31 and the outer peripheral surface 21 of cap 20 form a guide groove 35. Cover 30 includes a hole or notch 38 extending radially therethrough.

As seen in FIGS. 1 and 2, cover 30 is attached in fixed relation to machine frame 40 by bolt attachments at ears 41A-41C. A solenoid 42 is likewise attached to frame 40 and in a position such that plunger 43 thereof enters notch 38 of cover 30. As shown, plunger 43 is normally biased outwardly with respect to hole 38 so as to allow pin 25 to assume the disengaged position shown in FIG. 2. Actuation of solenoid 42 drives plunger 43 radially inwardly so that pin 25 assumes the engaged position of FIG. 1 wherein the radially inner end portion of pin 22 enters one of hub holes 15 while shouldered end 26 is positioned so as to enter the guide channel 35.

Once pin 25 is in the engaged position shown in FIG. 1, the rotation of hub 12 causes a transverse surface of the engaged hub hole 15 to apply force against the inner end portion of pin 26 and thus to transfer the rotary motion to inner cap 20. Pin 25 remains in guideway 35 until a full revolution is completed at which time the shouldered end 26 again enters notch or hole 38 in response to the bias force continuously applied by spring 28 between the shouldered end 26 of pin 25 and the surface 21 of cap 20. By including eight hub holes 15 as shown in this example, the primary power source applied to rotate hub 12 causes no more than 45 degrees of rotation before a hub hole 15 is engaged by pin 25 and output rotation of cap 20 commences.

Output shaft 45 has a reduced shoulder 46 at one end for the purpose of attachment via D-shaped hole 48 in inner cap 20. Therefore shaft 45 rotates under control of inner cap 20 as a function of the engagement or disengagement of pin 25 with hub 12.

In the particular application example shown in FIG. 2, output shaft 45 is attached to a toner metering roll 49 located within the reservoir of toner material for a copier. For each rotation of output shaft 45, metering roll 49 dispenses a small amount of toner from the reservoir into the developer (not shown). Note that FIG. 13 is a perspective view from below to show the relationships of the notch 38 and the pin positioning/engaging holes.

In operation, gear 11 is continuously rotated by main drive gear 10 and thus causes hub 12 to continuously rotate. As long as solenoid 42 is not actuated, plunger 43 is sufficiently withdrawn into notch 38 to allow pin head 26 to enter notch 38 thereby withdrawing the inner end of pin 26 from engagement with hub holes 15. Solenoid 42 is briefly actuated driving plunger 43 radially inward so that the inner end of pin 26 slides over the surface of hub 12 until it enters one of holes 15. At that point, the head 26 is positioned so as to enter groove 35 which holds pin 26 is engaged position thereby mechanically coupling hub 12 to cap 20. Cap 20 thus rotates with hub 12. Shaft 45 thereby rotates with cap 20 to which it is attached until pin 25 again is in alignment with notch 38. As long as solenoid 43 is deactuated, spring 28 drives pin 25 into notch 38 and out of engagement with hub 12. Therefore one revolution of output shaft 45 is obtained for one revolution of gear 11. Note that the maximum time required for actuation of solenoid 42 is approximately the same as that required for hub 12 to rotate through 45 degrees since eight holes 15 are included in hub 12. Use of a greater number of holes 15 on hub 12 further reduces the required on-time for solenoid 42 although only one hole 15 can be used if desired. The controls for solenoid 42 can include means for holding actuation of solenoid 42 until at least some rotation of shaft 45 is detected.

The drive shaft 45 and metering roll 49 are operable for metering toner substantially in accordance with the structure shown in U.S. Pat. No. Re. 28,589 entitled "Xerographic Toner Dispenser" by Knight and Miller commonly assigned to the same assignee as this application. The device particularly as shown in FIG. 2 operates in such an environment by employing the developer sump auger gear to drive gear 10 which continuously rotates gear 11 about the metering roll shaft 45. To actuate the clutch as shown, solenoid 42 is energized and pushes plunger 43 into engagement with the pin 25 thereby establishing coupling between cap 20 and gear 11. Since pin 25 is connected to cap 20 and cap 20 is fixed to metering roll shaft 45, the metering roll 49 rotates. Pin 25 is prevented from disengaging during rotation by retainer cover or plate 30. At the end of one complete revolution, pin 25 slides radially outward in response to the bias force applied thereto by spring 28 and enters slot 38 to return to its original disengaged position, thus allowing gear 11 to again freely rotate around output shaft 45.

Although not forming a part of the present invention, gear 11 as shown in FIG. 2 includes an eccentric cam portion 18 on the side opposite hub 12. Cam 18 cooperates with a pivotally mounted arm 44 for the purpose of sensing the level of toner within the reservoir area whenever gear 11 rotates. That is, toner low arm 44 is lifted upwardly once for each revolution of the output shaft in FIG. 2 and lowered so as to rest upon the upper level of the toner in the replenisher chamber. Thus low toner is sensed by actuation of a switch (not shown). This operation is relatively well known in the prior art and forms no part of this invention.

Figure 5:
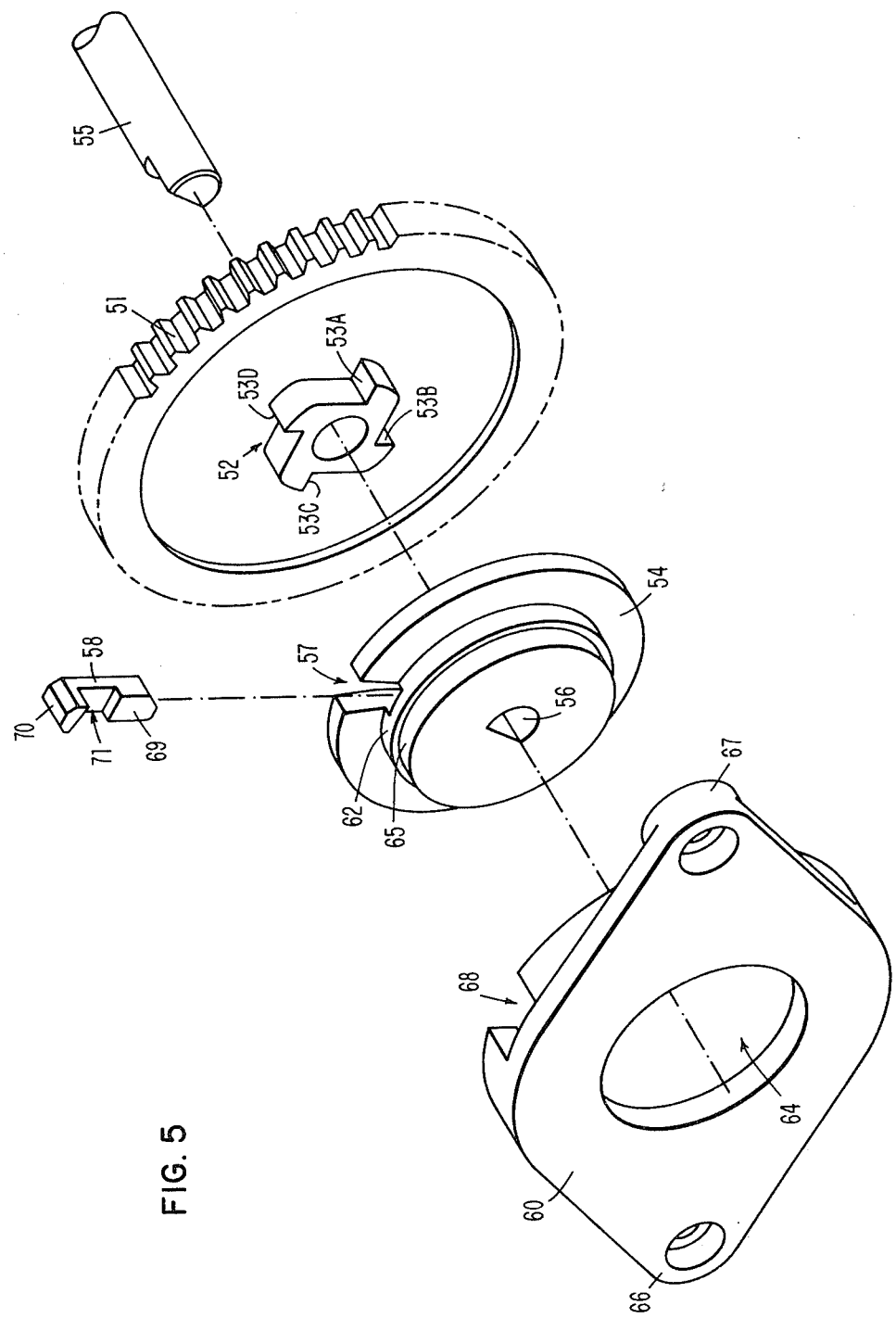
FIG. 5 is a disassembled perspective view of the components of the FIG. 4 embodiment.
Figure 6:
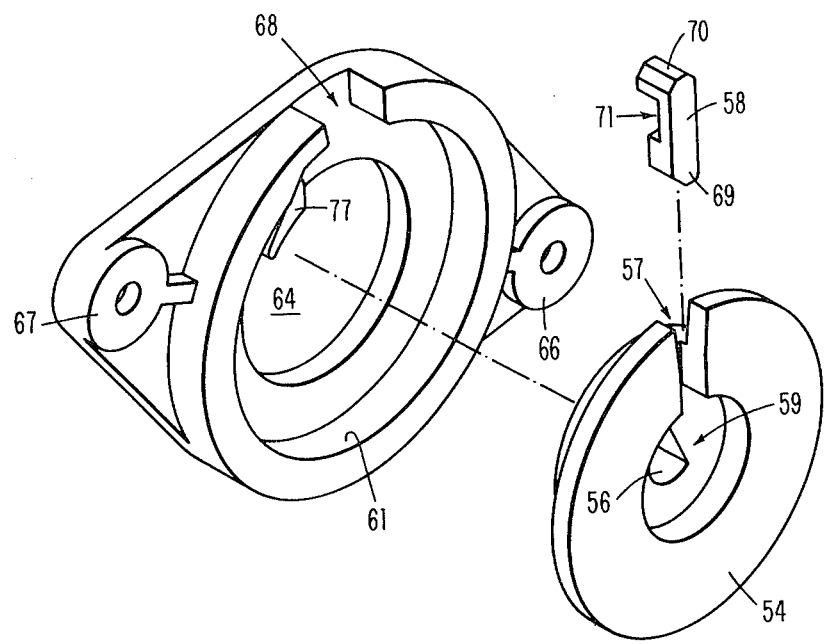
FIG. 6 is a disassembled perspective view of the fixed collar, cap and follower arm of the FIGS. 4 and 5 embodiment.

Another embodiment of the present invention is shown in FIGS. 4–6. FIG. 4 is a partially broken, partially sectioned view showing four stages of operation of this embodiment wherein one revolution of output is produced for each actuation of plunger 50. Plunger 50 is any mechanical device selectively movable over a distance such as a solenoid or other mechanical actuator mechanism. Gear 51 operates similarly to gear 11 in that it is continuously rotated by an input drive means not shown in FIGS. 4–6.

As best seen in FIG. 5, gear 51 includes as an integral part thereof a hub 52 which is formed with four ratchet faces or surfaces 53A–53D each of which is a surface positioned transverse to the direction of rotation of gear 51 about its axis. Inner member 54 is somewhat cup-shaped and receives output shaft 55 by attachment on the D-shaped hole 56. That is, gear 51 freely rotates around output shaft 55 whereas shaft 55 is attached to inner cap 54 in a manner similar to the FIGS. 1–3 embodiment. Cap 54 also includes a radially extending slot 57 for slidably retaining follower arm 58. As best seen in FIG. 6, cap 54 includes an inner cavity 59 which is arranged to surround hub 52 of gear 51 when the device is fully assembled.

Retainer cover 60 includes an inner circular surface 61 arranged in concentric, surrounding relation to surface 62 of cap 54 so as to define a guide groove in the location indicated at 63 in FIG. 4. Retainer cover 60 includes a hole 64 into which the outer shoulder 65 of cap 54 is placed in assembly (note FIG. 5) to further retain inner cap 54 in alignment. Cover 60 is fixed relative to the machine frame (not shown) by appropriate attachments at shoulders 66 and 67. A radial notch 68 is positioned to accept the movable actuator plunger 50 as well as the outer end of the follower arm 58.

Follower arm 58 includes an inner end portion 69 which affects coupling between cap 54 and hub 52 by engaging an appropriate surface 53 as well as the inner walls of hole 57 in cap 54. Outer end portion 70 of follower arm 58 cooperates with the guide groove 63 and other elements including actuator plunger 50 and notch 68. A central notch 71 in arm 58 slides over inner wall 77 of cam 75 (note FIG. 6) during rotation of cap 54 since cam 75 only extends partially into groove 63. This configuration accommodates cammed release of arm 58 as is described below.

The operating interrelationship of the parts is best seen in FIG. 4. FIG. 4A shows arm 58 in its neutral, disengaged position prior to being engaged by plunger 50. Note that inner end portion 69 is within slot 57 clear of any transverse surface 53 on hub 52. In FIG. 4B, plunger 50 has moved radially inward to force arm 58 into the position so that end portion 69 engages surface 53 while outer end portion 70 is aligned with groove 63. Accordingly, the rotary force applied to gear 11 is transferred from surface 53 and arm 58 to inner member 54 and thus output shaft 55. As the coupled elements rotate, inner peripheral surface 61 of cover 60 retains arm 58 in the engaged position as is seen in FIG. 4C. Eventually sloped face 78 of follower arm 58 engages the channel between cam 75 and outer surface 76, which causes arm 58 to partially withdraw until only the sloped surface 79 on the inner portion of arm 58 is engaged by the ratchet surface 53. This is shown in FIG. 4D. Pin or arm 58 is directed towards slot 68 of cover 60 and the disengaged position is accomplished by the camming action between surface 53 and sloped surface 79 to assume the FIG. 4A position thereby completing one cycle of rotation for each actuation of plunger 50.

The device of FIG. 4 is shown with the pin downwardly extracted for disengagement and upwardly moved for engagement. If the configuration is oriented so that slots 68 and 57 align in a downward direction towards the center of rotation, it is possible for gravity to re-engage arm 58 with a hub surface 53 after each extraction by the cam faces but by a delay correlated to the center ratchet face configuration. This means that, with four ratchet faces 53 as shown, a 90 degree delay relative to the input drive rotation is accomplished before starting the next full revolution of the output shaft 55. This result is obtained without any actuator plunger whatsoever. Further, termination of operation is obtained by rotating the slot 68 until gravity no longer causes arm 58 to engage hub surface 53. Other delay sequences are available depending upon the number and/or spacing of transverse faces 53 and even unsymmetrical delays are thus obtained if desired. The FIG. 4 embodiment in the orientation as shown operates as a single revolution clutch using only gravity for disengaging pin 58, particularly if the pin is of sufficient mass and the output load is relatively light. In such circumstances, no cam 75 is required.

Reviewing the operation of the FIGS. 4–6 embodiment, gear 51 is driven by an input source and freely rotates when the clutch is not actuated. Actuation of the clutch is affected by moving plunger 50 radially inward as by actuation of a solenoid, mechanical coupling or the like, thus pushing arm 58 into engagement with a ratchet face 53 on hub 52 of gear 51. Since arm 58 is connected to cap 54 which is in turn connected to the drive shaft 55 by the D-shaped hole, output shaft 55 rotates with the input source. Cover 60 which functions as a mounting/retainer bracket prevents arm 58 from becoming disengaged during rotation. As the unit approaches a complete revolution, the inclined portion 78 of arm 58 contacts cam 75 which forces arm 58 out of engagement with gear 51. The function of cam 75 is obtainable through use of a simple fixed pin or the like.

Figure 7:
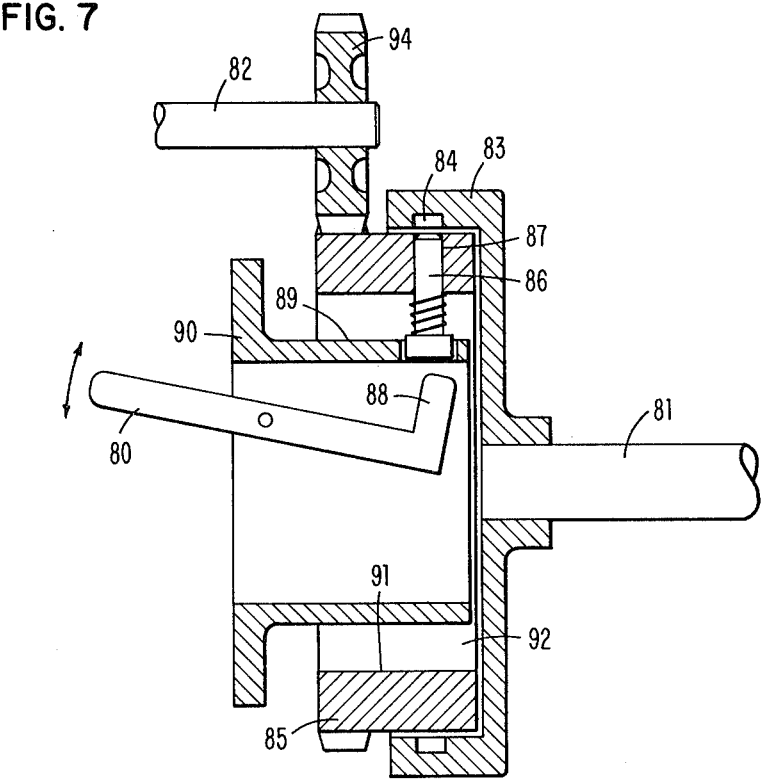
FIG. 7 shows a sectioned side view of a one-revolution clutch similar to the embodiment of FIGS. 1-3 but modified for a different mode of operation.

FIG. 7 illustrates a modification in accordance with the present invention to allow response to pivoting of an actuator arm 80 so as to couple rotary input power from shaft 81 to output shaft 82 as in a one-revolution clutch. In this version, shaft 81 is connected to a generally cup-shaped member 83 which has one or more detent holes 84 therein arranged so that they concentrically overlie an inner member 85. A pin 86 which is spring-biased in a radial inward direction within hole 87 of inner member 85 responds to pivoting of plunger 80 and radially outward movement of end 88 so as to couple rotary inner member 85 to outer drive 81. The outer peripheral surface 89 of fixed end collar 90 and the inner surface 91 of inner member 85 form a circular guide groove 92 for retaining pin 86 in its engaged position as the elements rotate together. Inner member 85 is retained in its circular orientation by means not shown such as bearing elements or the like and has peripheral teeth arranged to engage output gear 94 which drives output shaft 82. Thus in the FIG. 7 embodiment, rotary input power is coupled for one revolution in response to each actuation of lever arm 80 by moving coupler pin 86 in an outwardly radial direction.

Figure 8:
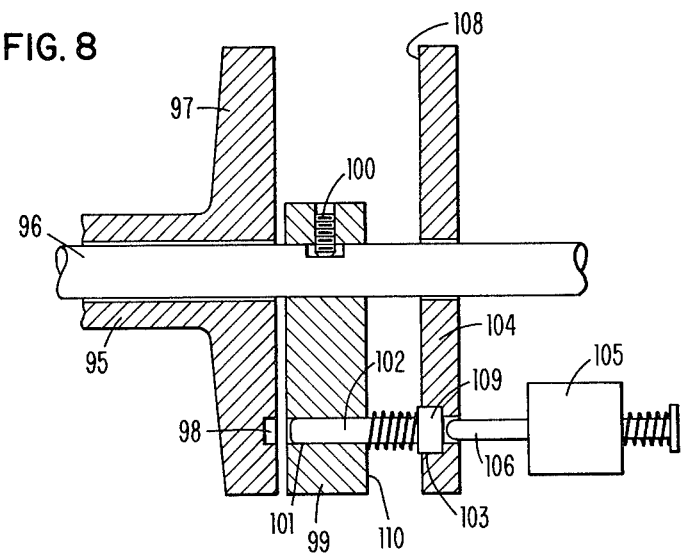
FIG. 8 is a partially sectioned side view of yet another embodiment of the present invention wherein the coupling pin moves parallel relative to the axis of rotation of the input and output drives.

Yet another embodiment of the present invention is shown in FIG. 8 wherein input shaft 95 is coupled to output shaft 96 in a one-revolution clutch configuration. Input shaft 95 has a circular disc 97 attached thereto with one or more detent holes 98 arrayed in a circular pattern along the face of plate 97. An arm 99 is attached to shaft 96 such as by set screw 100 and has a hole 101 therein parallel to the axis of rotation of shafts 95 and 96. Pin 102 which is spring-biased in a direction away from plate 97 enters a hole 103 is a fixed circular guideway plate or wall 104 to disengage as is shown in FIG. 8. Operation of solenoid 105 causes plunger 106 to drive pin 102 to the left in FIG. 8 until the leftmost end portion of pin 102 enters one of detents 98 thereby establishing coupling between shafts 95 and 96. The inner face 108 of fixed wall 104 establishes a guideway for the head portion 109 of pin 102 to complete the rotary coupling for one revolution. In effect, walls 110 of arm 99 and 108 of fixed plate 104 form the guideway for maintaining the pin 102 in the engaged position during the revolution. Thus, arm 99 is not restricted to a disc or cup-shaped configuration. In fact arm 99 as illustrated is a linear bar which is also applicable with proper orientation for inner members 20 and 85 in FIGS. 1 and 7, respectively. In addition, one or more radial spokes from input shaft 95 can provide the function of disk 97 and detent holes 98 as long as such spokes include at least one transverse surface to engage pin 102 when pin 102 is moved leftward in FIG. 8. Note that the cammed follower arm arrangement of FIGS. 4–6 is adaptable for use in an arrangement such as FIGS. 7 and 8. The input drive for any of the embodiments is reciprocably operable such as by a rack gear particularly with respect to the versions of FIGS. 1, 7 and 8 which are bidirectionally operable. The input for the FIGS. 4–6 embodiment is reciprocably operable but output coupling is obtained in only one rotary direction. Multiple holes included around the periphery of the fixed cover or collar allow selection of less than or more than a full revolution for the output per actuation. This is obtained in a configuration such as FIGS. 1–3, by including a multiplicity of slots 38 within cover 30, each arranged with an appropriate plunger arm such as arm 33 of a solenoid such as 42. As a result, the input is coupled to the output for a proportion of the rotary motion of the input shaft correlated to the distance between each of such slots 38 and a full rotary input to output is accomplished by maintaining all intermediate actuator plungers in their actuated position except for the plunger commencing the operation. In a FIGS. 4–6 configuration, a separate cam surface or camming pin is necessary at each opening although, if a plunger with an appropriately shaped cam surface on its end is used, leaving the plunger in the actuated position affects staggered coupling correlated to the number of transverse surfaces 53 included in the hub 52. Of course, the ratchet-type faces of the FIGS. 4–6 embodiment are easily adaptable for a FIGS. 1–3 arrangement. Note also that continued actuation of the operating plunger for embodiments such as FIGS. 1, 7 and 8 results in continued coupling of the input and output since the plunger inner face effectively acts as a continuing surface of the guideway wall.

Although the foregoing describes the present invention with particularly relative to detailed descriptions of the exemplary preferred embodiments, those having normal skill in the art will readily recognize various modifications, changes, additions and applications of the present invention in addition to those mentioned herein without departing from the spirit of this invention.

What is claimed is:

1. A clutch for coupling rotary mechanical power between a first member and a second member in response to movement of at least one plunger element comprising:

a hub rotatably attached to one of said members, said hub having at least one surface extending in a direction transverse to the direction of rotation of said hub;

a rotatably mounted plate attached for applying rotary drive to the other of said members, said plate having a hole therethrough located for aligning a surface of said hole with said hub surface at least once for each revolution of said hub;

a pin movably mounted in said plate hole and having a length for assuming first and second positions, one end portion of said pin engaging said aligned hub and plate when said pin is in said first position, the said one pin end portion clearing said hub surface when said pin is in said second position, the opposite end portion of said pin having a shoulder extending transverse to the length of said pin;

means retaining the opposite end portion of said pin for maintaining said pin first position for at least a portion of the rotation of said hub, said retaining means including means permitting said pin opposite end to move away from said plate for assuming said pin second position in at least one location for each revolution of said plate, said retaining means receiving said plunger element into engagement with said pin opposite end at said one location for shifting said pin from said second position to said first position in response to said plunger element movement; and means urging said pin toward said second position at said plunger element receiving location, said urging means including a cam surface having a fixed relation to said first and second members in position for engaging said pin shoulder for directing said pin into said second position.

2. A clutch for coupling rotary mechanical power from a first member to a second member in response to movement of at least one plunger element comprising:

a hub attached for rotation by one of said members, said hub having at least one surface extending in a generally radial direction relative to the axis of rotation of said hub;

a cap attached for applying rotary motion to the other of said members and for freely rotating concentrically relative to said hub, said cap having an opening extending therethrough in a radial direction relative to said hub axis;

a fixed collar mounted in concentrically spaced relation relative to said cap for forming a circular guide groove, said collar having at least one radial opening into said groove for receiving said plunger element;

a pin radially slidable in said cap opening and having a length for assuming first and second positions wherein one end engages said hub surface when said pin is in said first position while said one end is clear of said hub surface when said pin is in said second position, the opposite end of said pin being adapted to move into said fixed collar opening for establishing said second position, said pin opposite end responding to entry of said plunger element into said fixed collar opening for establishing said first position and for cooperating with said fixed collar formed guide groove for maintaining said first position while said pin opposite end is in said groove, said pin including an arm adapted to move within said guide groove; and urging means including a cam surface in fixed relation to said hub and said cap and positioned for intercepting said arm in said guide groove and for directing said arm into said fixed collar opening.

3. A clutch in accordance with claim 2 wherein said hub includes a plurality of said surfaces in spaced relation and each extending in a generally radial direction relative to the axis of rotation of said hub.

4. A clutch for coupling a rotating input member to an output shaft in response to movement of a plunger comprising:

a hub connected for rotating in response to said input member and having a plurality of spaced surfaces each extending in a generally radial direction relative to the axis of rotation of said hub;

a cap attached to said output shaft and having at least a segment of a circular surface in concentrically surrounding, free rotation relation relative to said hub, said cap having an opening extending therethrough in a radial direction;

a fixed collar mounted in spaced, surrounding relation relative to said cap for forming a circular groove therebetween, said collar having a radial opening therethrough into said groove for receiving said plunger;

a pin having a shoulder transverse to its length at one end, said pin being movably positioned in said cap opening and having a length for assuming a disengaged position wherein said shoulder is within said fixed collar opening while the opposite end of said pin is in said cap opening and an engaged position wherein said shoulder is within said circular groove while said pin opposite end is in engagement with one of said hub surfaces, said shoulder end of said pin being responsive to said plunger for establishing one of said positions; and means urging said pin in the direction of said disengaged position at least in proximity to said collar opening, said urging means including a cam surface in fixed relation to said hub and said cap and positioned for intercepting said shoulder in said groove and for directing said pin shoulder end into said collar opening.

* * * * *